United States Patent [19]

Hecht

[11] Patent Number: 4,940,314

[45] Date of Patent: Jul. 10, 1990

[54] VARIABLE WAVELENGTH DISCRETE OPTICAL IMAGE BARS HAVING PASSIVELY ENHANCED SPATIAL ADDRESSING CAPACITY

[75] Inventor: David L. Hecht, Menlo Park, Calif.

[73] Assignee: Xerox Corporation, Stamford, Conn.

[21] Appl. No.: 289,496

[22] Filed: Dec. 23, 1988

Related U.S. Application Data

[63] Continuation of Ser. No. 733,356, May 13, 1985, abandoned.

[51] Int. Cl.⁵ ............... G01D 15/14; G02F 1/01
[52] U.S. Cl. ................... 350/355; 346/106; 350/356
[58] Field of Search ............ 350/286, 355, 356; 355/50; 346/1.1, 160

[56] References Cited

U.S. PATENT DOCUMENTS

| | | | |
|---|---|---|---|
| 4,093,976 | 6/1978 | Das | 350/356 |
| 4,250,465 | 2/1981 | Leib | 372/24 |
| 4,281,904 | 8/1981 | Sprague et al. | 350/356 |
| 4,367,925 | 1/1983 | Sprague et al. | 350/356 |
| 4,396,252 | 8/1983 | Turner | 350/355 |
| 4,415,915 | 11/1983 | Sprague et al. | 346/160 |
| 4,450,459 | 5/1984 | Turner et al. | 346/160 |
| 4,483,596 | 11/1984 | Marshall | 350/385 |
| 4,492,435 | 1/1985 | Banton et al. | 350/360 |
| 4,509,058 | 4/1985 | Fishbeck | 346/1.1 |
| 4,626,102 | 12/1986 | Storck et al. | 350/358 X |
| 4,673,953 | 6/1987 | Hecht | 350/358 X |

OTHER PUBLICATIONS

"Linear Led Array has 300 Pixel/in. Resolution", John Gosch, Electronics Week, Jan. 21, 1985, p. 21.

Primary Examiner—Bruce Y. Arnold
Assistant Examiner—Martin Lerner

[57] ABSTRACT

A variable wavelength discrete optical image bar sequentially generates a plurality of independent pixel patterns at different center wavelengths and a prism disperses those pixel patterns in accordance with their respective wavelengths. Lateral dispersion increases the spatial addressing capacity of the image bar.

In line printers and the like where a recording medium is exposed to successive pixel patterns as it is advancing in a cross-line direction with respect to a linear image bar, the wavelength dependent dispersion of the prism system may be employed to partially or completely compensate for such cross-line motion. This cross-line dispersion may be used independently to cause the image bar to overwrite successive pixel patterns, or it may be combined with the lateral dispersion of the pixel patterns to increase the spatial addressing capacity of the image bar.

18 Claims, 6 Drawing Sheets

VARIABLE WAVELENGTH DISCRETE OPTICAL IMAGE BARS HAVING PASSIVELY ENHANCED SPATIAL ADDRESSING CAPACITY

This is a continuation of application Ser. No. 06/733,356, filed 5/13/85, now abandoned.

FIELD OF THE INVENTION

This invention relates to discrete optical image bars and, more particularly, to methods and means for passively increasing their spatial addressing capacities.

BACKGROUND OF THE INVENTION

As a matter of definition, an "optical image bar" comprises an array of optical picture element ("pixel") generators for converting a spatial pattern, which usually is represented by the information content of electrical input signals, into a corresponding optical intensity profile. Although there are a variety of applications for such devices in a number of different fields, a significant portion of the effort and expense that have been devoted to their development has been directed toward their application to electrophotographic printing, where they may prove to be a relatively low cost and reliable alternative to the flying spot raster scanners which have dominated that field since its inception. Another potentially important application for these image bars is in displays, although that possibility has received relatively little attention to date.

Several different types of image bars have been proposed, including electrically addressable LED arrays (see "Linear LED Array Has 300 Pixel/In. Resolution," *Electronics Week*, Jan. 21, 1985, p. 21), electromechanical spatial light modulators (see a commonly assigned U.S. Pat. No. 4,492,435 of M. E. Banton et al., which issued Jan. 8, 1985 on a "Multiple Array Full Width Electro Mechanical Modulator"), and electrooptic spatial light modulators (see another commonly assigned U.S. Pat. No. 4,281,904 of R. A. Sprague et al., which issued Aug. 4, 1981 on a "TIR Electro-Optic Modulator with Individually Addressable Electrodes"). Also see, "Light Gates Give Data Recorder Improved Hardcopy Resolution," *Electronic Design*, Jul. 19, 1979, pp. 31-32; "Polarizing Filters Plot Analog Waveforms," *Machine Design*, Vol. 51, No. 17, Jul. 26, 1979, p. 62; and "Data Recorder Eliminates Problem of Linearity," *Design News*, Feb. 4, 1980, pp. 56-57. Even though these image bars are based on diverse technologies, they share the common characteristic of having finite spatial addressing capacities (i.e. they are "discrete image bars") because there are only certain, predetermined coordinates ("addresses") in image space upon which they can center pixels. In other words, the image plane "footprint" of such an image bar envelopes a continuum of space, but the centers of the pixels are confined to certain discrete locations therein due to the limited addressing capacity of the image bar. For example, the addresses upon which pixels can be centered by a linear image bar of the foregoing type are laterally restricted. Consequently, there are spatial quantization errors which detract from the precision with which these image bars can locate pixels in an image plane, thereby tending to introduce unwanted spatial distortion into the image. Furthermore, if the image plane diameter of the individual pixels is less than their center-to-center displacement, the restricted addressing capacity of these image bars also causes interpixel intensity nulls.

Some of the more interesting image bar proposals are based on the use of TIR (total internal reflection) electrooptic spatial light modulators. In keeping with the teachings of a commonly assigned U.S. Pat. No. 4,396,252 of W. D. Turner, which issued Aug. 2, 1983 on "Proximity Coupled Electro-Optic Devices," such a modulator typically comprises a set of laterally separated, individually addressable electrodes which are maintained closely adjacent a reflective surface of an optically transparent electrooptic element, such as a lithium niobate crystal. In operation, substantially the full width of the electrooptic element is illuminated by a transversely collimated light beam. This light beam is applied to the electrooptic element at a near grazing angle of incidence with respect to its reflective surface and is brought to a wedge shaped focus on that surface, so that it is totally internally reflected therefrom. Moreover, voltages representing laterally adjacent pixels (i.e., a linear pixel pattern) are applied to the individually addressable electrodes, whereby localized fringe electric fields are coupled into the electrooptic element. These fields produce localized variations in the refractive index of the electrooptic element, so the wavefront of the light beam is spatially phase modulated in accordance with the pixel pattern as it passes through the electrooptic element. The process is repeated for a sequence of pixel patterns, with the result that the wavefront of the light beam is spatially modulated as a function of time in accordance with successive ones of those patterns. For image bar applications of such a modulator, Schlieren optics are employed to convert the phase modulated wavefront of the light beam into a corresponding series of optical intensity profiles. If a printing function is being performed, these intensity profiles are, in turn, used to expose a photosensitive recording medium, such as a xerographic photoreceptor, in accordance with the image defined by the successive pixel patterns.

There have been several significant developments which have reduced the cost and increased the reliability of TIR electrooptic image bars. Among these are a so-called "differential encoding" technique that is described in a commonly assigned U.S. Pat. No. 4,450,459 of W. D. Turner et al., which issued May 22, 1984 on "Differential Encoding for Fringe Field Responsive Electro-Optic Line Printers" and an electrical interconnect strategy that is described in a commonly assigned U.S. Pat. No. 4,367,925 of R. A. Spague et al., which issued Jan. 11, 1983 on "Integrated Electronics for Proximity Coupled Electro-Optic Devices." Briefly, it has been shown that the number of electrodes that a TIR electrooptic image bar requires to achieve a given resolution can be reduced by a factor of almost two if the input data samples (i.e., the electrical representations of the pixels to be printed) are differentially encoded, such that the magnitude of each of them, except for those that represent the initial pixels for the successive lines of the image, is referenced to the magnitude of the immediately preceeding sample. Additionally, it has been demonstrated that more or less conventional VLSI circuit technology may be employed to integrate the electrodes with their addressing and drive electronics, thereby promoting the orderly and reliable distribution of data samples to the large number of electrodes that ordinarily are required for reasonably high resolution printing.

Typically, the effective diameter of the pixels produced by an electrooptic image bar, as measured between their half power points at unity magnification, is approximately one half the center-to-center spacing of its electrodes. Accordingly, such image bars not only tend to cause image distortion because of spatial quantization errors, but also characteristically produce interpixel intensity nulls.

A copending and commonly assigned U.S. patent application of D. L. Hecht, which was filed 13 May 1985 under Ser. No. 733,354 now abandoned on "Discrete Image Bars Having Enhanced Spatial Addressing Capacity" (D/83038) teaches that the spatial addressing capacity of a discrete image bar may be increased by translating the position of its optical footprint laterally relative to its output image plane as a function of time, thereby enabling the image bar to incoherently superimpose on the image plane a plurality of independent pixel patterns which are laterally offset from one another by a distance that is less than the center-to-center spacing of the pixels of any one of those patterns. Also see, a commonly assigned U.S. Pat. No. 4,509,058 of K. H. Fischbeck, which issued Apr. 2, 1985 on "Ink Jet Printing Using Horizontal Interlacing" for a related concept as applied to ink jet printer arrays. These prior proposals have suggested the use of mechanical motion to enhance the spatial addressing capacity of discrete printing arrays, so it will be evident that the fundamental advantage of this invention is that it provides passive optics for performing that function, thereby avoiding the classical mechanical design problems of reliability, precision and repeatability. Another commonly assigned U.S. Pat. No. 4,483,596 of S. W. Marshall, which issued Nov. 20, 1984 on "Interference Suppression Apparatus and Method for a Linear Modulator," discloses a passive optical system for avoiding the destructive interference that can cause interpixel intensity nulls when using electrooptic image bars, but that proposal does not enhance the spatial addressing capacity of the image bar.

SUMMARY OF THE INVENTION

In accordance with the present invention, a discrete optical image bar sequentially generates a plurality of independent pixel patterns at different center wavelengths, and a prism system or equivalent optical means disperses those pixel patterns in accordance with their respective wavelengths to passively increase the spatial addressing capacity of the image bar. The wavelengths of the pixel patterns, the angular dispersion of the prism system, and the length of the optical arm along which the dispersion has effect are selected so that the pixel patterns are laterally offset from one another on the output image plane by a distance that is less than the center-to-center spacing of the pixels of any one of those patterns. In line printers and the like, where a photosensitive recording medium is exposed to successive pixel patterns while advancing in a sagittal, cross-line direction relative to the image bar, the prism system may be tilted at an appropriate angle with respect to the tangential plane of the printer so that the successive pixel patterns are not only laterally offset from one another, but also sagittally translated to partially or completely compensate for the cross-line motion of the recording medium. As a general rule, the wavelength of the pixel patterns is cyclically or otherwise recurrently varied, so that the pixel patterns are interlaced in accordance with a predetermined lattice-like interlacing pattern.

Preferably, the dispersion of the pixel patterns is provided by a pair of substantially identical, oppositely oriented thin prisms, so that the optical distortion of the pixel patterns is more or less minimized. In an electrooptic line printer, these prisms suitably are disposed between the spatial light modulator and the Schlieren imaging optics to take advantage of the telecentricity that usually exists in that region.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to a certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
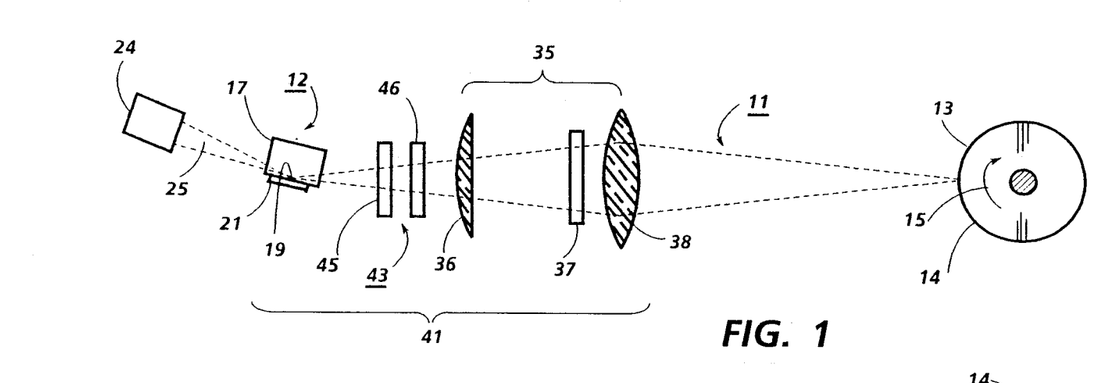
FIG. 1 is a schematic sagittal plane view of a line printer embodying the present invention.
Figure 2:
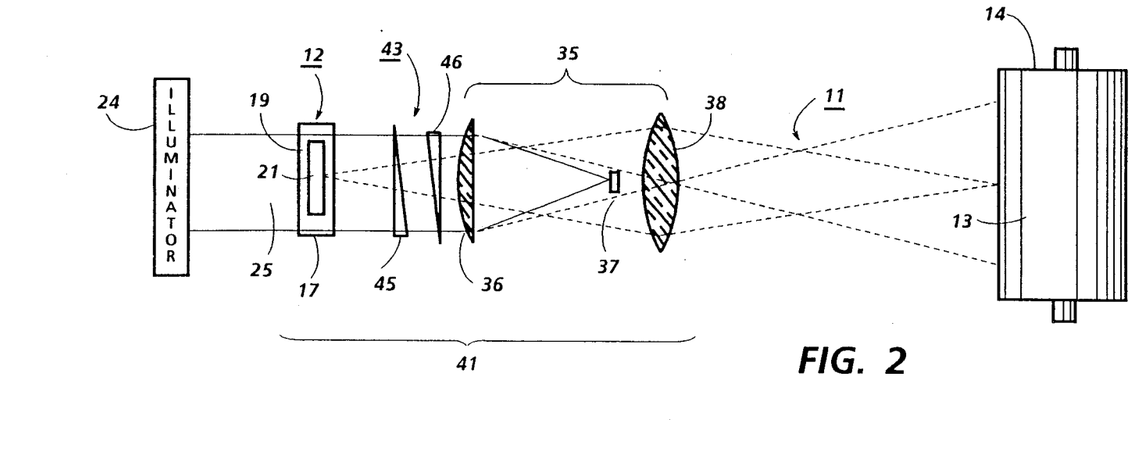
FIG. 2 is a schematic tangential plane view of the printer shown in FIG. 1.

Turning now to the drawings, and at this point especially to FIGS. 1 and 2, there is a line printer 11 having an electrooptic spatial light modulator 12 for printing an image on a photosensitive recording medium 13. As shown, the recording medium 13 is a photoconductively coated drum 14 which is rotated (by means not shown) in the direction of the arrow 15. Nevertheless, it will be evident that there are other xerographic and non-xerographic recording media that could be used, including photoconductively coated belts and plates, as well as photosensitive films and coated papers. Thus, in the generalized case, the recording medium 13 should be visualized as being a photosensitive medium which is exposed while advancing in a cross-line or line pitch direction relative to the modulator 12.

Figure 3:
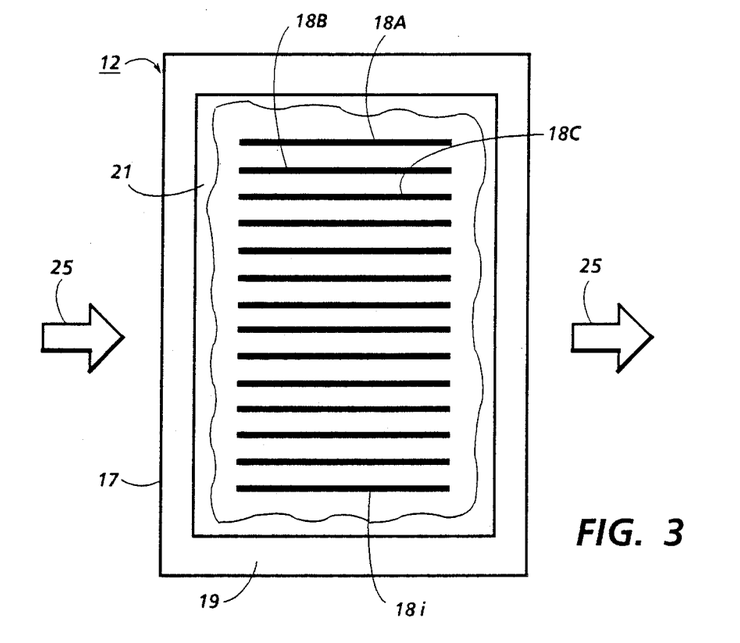
FIG. 3 is a partially cut-away, enlarged bottom view of the spatial light modulator for the printer shown in FIGS. 1 and 2.
Figure 4:
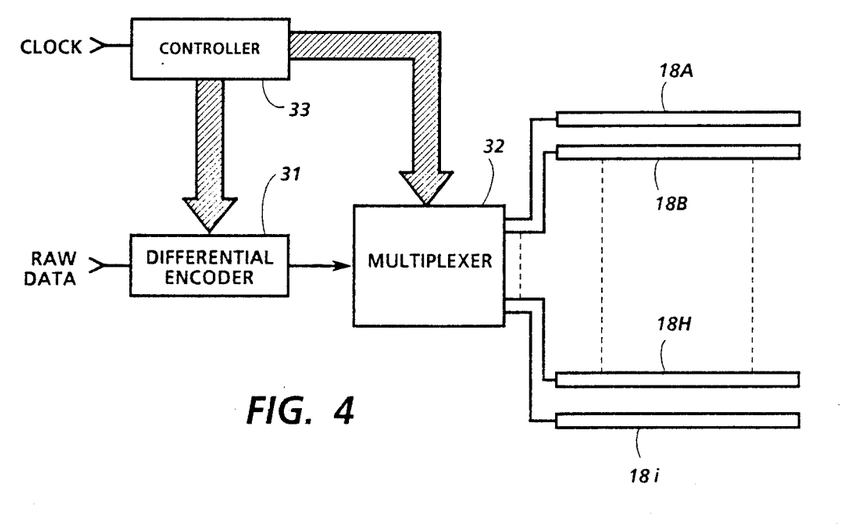
FIG. 4 is a simplified block diagram of a system for applying differentially encoded input data samples to the electrodes of the modulator shown in FIG. 3.
Figure 5:
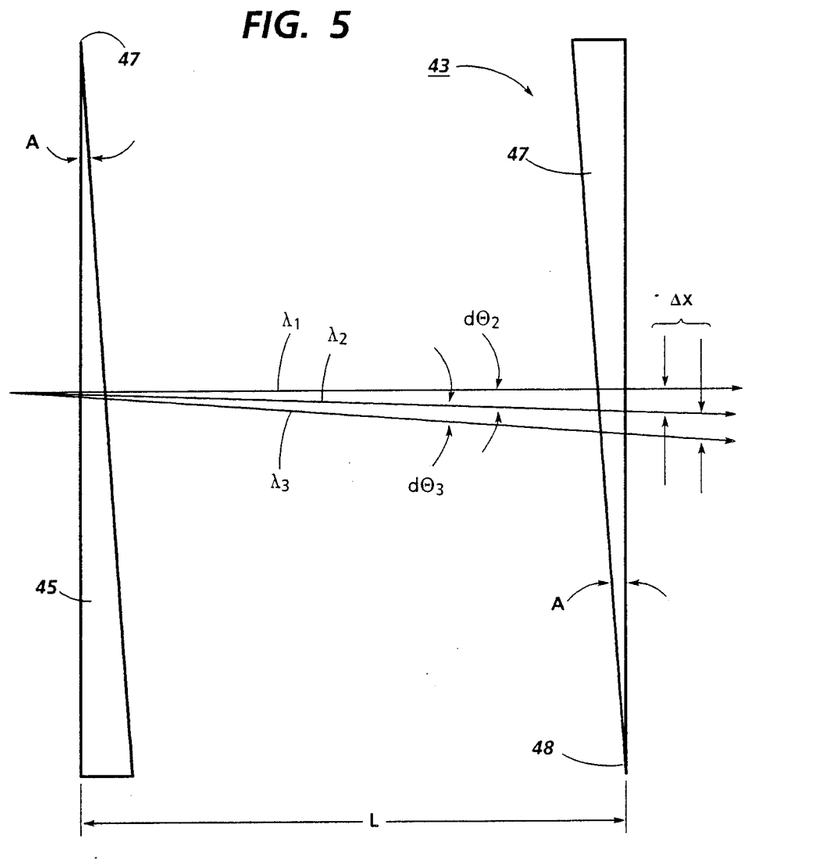
FIG. 5 is an enlarged tangential plane view of the prism system for the printer shown in FIGS. 1 and 2.
Figure 6:
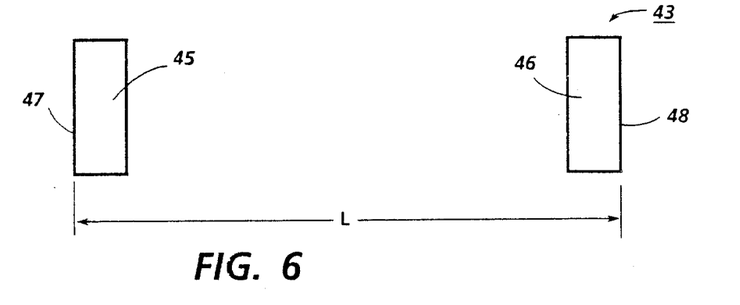
FIG. 6 is an enlarged sagittal plane view of the prism system.

As will be appreciated, the electrooptic spatial light modulator 12 represents one of several discrete image bars technologies with which the present invention may be utilized to advantage. In keeping with standard practices, it comprises an optically transparent electrooptic element 17, such as an optically polished, y-cut crystal of $LiNbO_3$, and a plurality of individually addressable electrodes 18a–18i (FIGS. 3 and 4). The electrodes 18a–18i are deposited on, or held closely adjacent, a longitudinal, reflective surface 19 of the electrooptic element 17. For example, they may be integrated with their addressing and drive electronics on a VLSI silicon circuit 21, and the modulator 12 may then be assembled so that the electrodes 18a–18i are pressed against the reflective surface 19 (by means not shown). Typically, the electrodes 18a–18i extend lengthwise of the electrooptic element 17 and are distributed widthwise of its reflective surface 19 on more or less uniformally displaced centers.

In operation, a variable wavelength illuminator 24, such as a tuneable laser or a plurality of selectively energizeable lasers or light emitting diodes (LEDs) having different, predetermined center wavelengths, supplies a transversely collimated light beam 25 which is expanded (by means not shown) if and as required to illuminate substantially the full width of the electrooptic element 17. This light beam is brought to a wedge shaped focus (by means also not shown) at a near grazing angle of incidence on the reflective surface 19 of the electrooptic element 17 and is totally internally reflected therefrom. Successive sets of data samples are sequentially applied to the electrodes 18a–18i, whereby the phase front of the light beam 25 is spatially modulated while passing through the electrooptic element 17 in accordance with successive pixel patterns as a function of time. Moreover, in keeping with this invention, the wavelength of the light beam 25 is also varied as a function of time, so that the successive pixel patterns may be passively interlaced as more fully described hereinbelow.

Advantageously, the data samples are differentially encoded prior to being applied to the electrodes 18a–18i, thereby eliminating the need for ground or reference plane electrodes (not shown). For that reason, as shown in FIG. 4, there is an encoder 31 for differentially encoding a serial stream of raw input data samples on a line-by line basis, a multiplexer 32 for rippling the encoded data samples onto the electrodes 18a–18i, and a controller 33 for synchronizing the encoder 31 and the multiplexer 32. As a general rule, the input samples are supplied at a predetermined data rate, so the encoder 31 and the multiplexer 32 characteristically are synchronized by the controller 33 to operate at that rate. However, if a rate change is required, a suitable buffer (not shown) may be used to accomodate it. The above-described data loading process is briefly suspended at the end of each line to provide a time slot for the illuminator 24 to change the wavelength of the light beam 25.

A central dark field or central bright field Schlieren imaging system 35 (FIGS. 1 and 2) converts the phase modulated wavefront of the light beam 25 into a corresponding intensity profile. To accomplish that, a central dark field system suitably includes a field lens 36 for focusing the transversely collimated zero order diffraction components of the light beam 25 (collectively represented by solid line rays in FIG. 2) onto an opaque stop 37. The zero order components of the light beam 25 are blocked because the stop 37 is centrally located in the rear focal plane of the field lens 36, but the higher order diffraction components (collectively represented by broken line rays in FIG. 2, together with broken line cones for a single pixel) scatter around the stop 37 and are collected by an imaging lens 38 which, in turn, focuses them on the recording medium 13 with a predetermined magnification. Alternatively, a central bright field system (not shown) could be used to perform the conversion process, although it will be understood that such a change would reverse the logical relationship of the individual pixels within the intensity profile to the localized phase modulation of the wavefront of the light beam 25 (i.e., "bright" pixels would become "dark" pixels, and vice-versa, unless steps were taken to account for the reversal in the logical relationship). As will be appreciated, the combination of the electrooptic spatial modulator 12 with the variable wavelength illuminator 24 and the Schlieren imaging system 35 is an example of what is referred to herein as a variable wavelength discrete image bar 41.

In accordance with the present invention, a prism system 43 is provided for anguarly dispersing the light beam 25 in accordance with its wavelength. The light beam 25 is, of course the carrier for the pixel patterns generated by the image bar 41, so successive pixel patterns are angularly dispersed by the prism system 43 because of the pixel pattern-to-pixel pattern variations in the wavelength of the light beam 25. Thus, for convenience, the center wavelength of the light beam 25 as spatially modulated in accordance with a given pixel pattern is sometimes referred to herein as "the center wavelength of the pixel pattern" or, even more concisely, simply as "the wavelength of the pixel pattern." The dispersion caused by the prism system 43 is lateral or, in some cases, both lateral and sagittal, so that the centers of the pixels of successive pixel patterns are laterally displaced from one another on the recording medium 13 by a distance which is less than the center-to center displacement of the pixels of any one of those patterns.

For an electrooptic image image bar, such as shown, the prism system 43 is suitably disposed between the modulator 12 and the Schleiren imaging system 35. The prism system 43 may cause sufficient angular deviation of the dispersed light beam 25 to warrant laterally offsetting the optical axis of the imaging system 35 from the optical axis of the modulator 12, but it has been assumed for purposes of this disclosure that the average deviation, if any, is so slight that it may be neglected. Indeed, as is known, there are so-called direct view prisms which are characterized by having an average deviation of zero. Here, however, the average deviation of the dispersed light beam 25 is merely a second order consideration because the imaging system 35 is telecentric (i.e., it is designed on the assumption that all principle rays of the image are substantially normal to the surface of the object being imaged). For that reason, the preferred prism system 43 comprises an optically aligned and oppositely oriented pair of substantially identical thin prisms 44 and 45 which are separated from one another by a predetermined optical distance. Such a system ensures that the angular dispersion of the light beam 25 that is produced by the first prism 45 is equalized by the substantially equal, but opposite dispersion that is produced by the second prism 46 so that the telecentricity of the light beam 25 is effectively restored, even though its different wavelength components are now displaced from one another. As will be appreciated, the amount of displacement that is created between any two wavelengths depends on the relative angular dispersion of those wavelengths by the prism 45 and the optical distance between the prisms 45 and 46 (i.e., the effective optical arm length of the dispersion).

Figure 7:
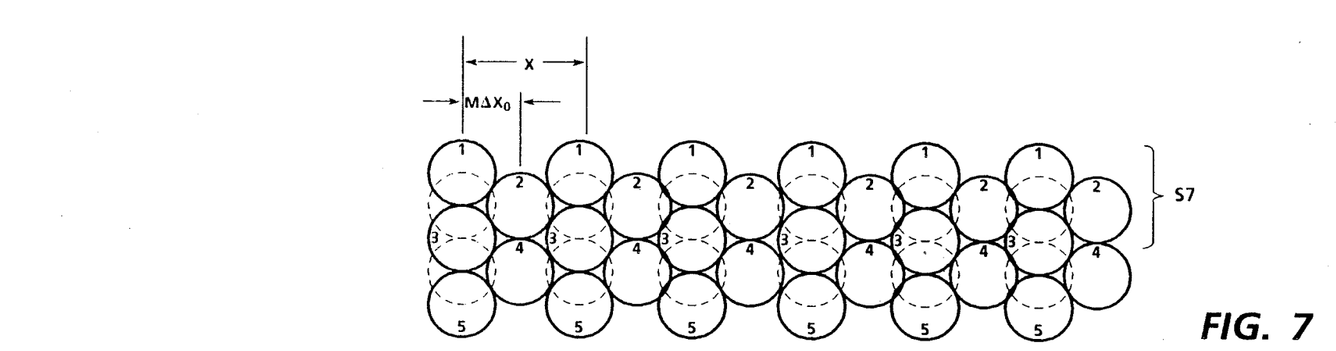
FIG. 7 illustrates a diamond-like pixel mapping pattern which can be obtained by interlacing odd and even numbered pixel patterns without compensating for the sagittal cross-line motion of the recording medium.
Figure 11:
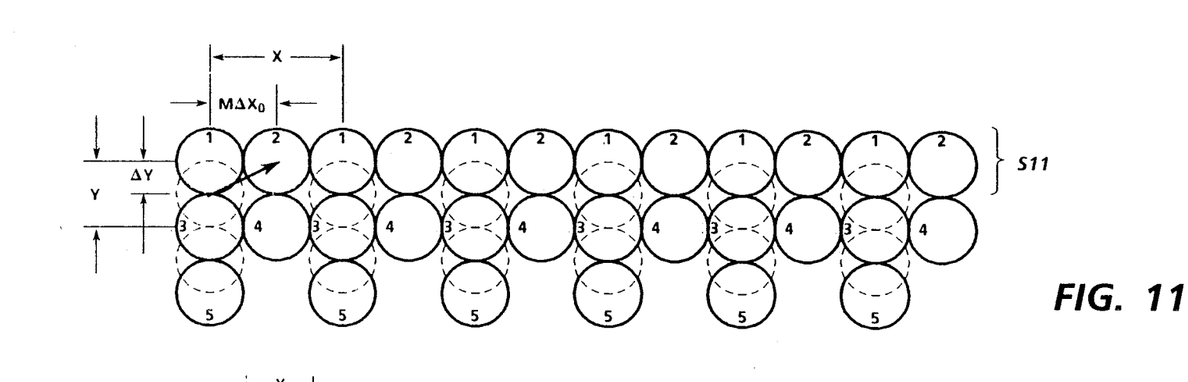
FIG. 11 is a rectangular pixel mapping pattern which may be obtained by interlacing odd and even numbered pixel patterns while completely compensating for the cross-line motion of the recording medium.

In keeping with this invention, the wavelength dependent displacement of the light beam 25 is relied upon to interlace one or more groups of N independent pixel patterns, where $N \geq 2$. The interlacing process may, of course, repeat itself after every N pixel patterns, thereby mapping the pixel patterns onto the recording medium 13 in accordance with a repetitive mapping pattern having N pixel patterns per period, as indicated at S7 (FIG. 7), S8 (FIG. 8), S9 (FIG. 9) S11 (FIG. 11). The cumulative lateral displacement of each group of N pixel patterns is less than the image plane center-to-center lateral displacement, X, of a single pixel pattern (i.e., the "nominal pixel pitch"). Furthermore, the center-to-center offset of the pixel patterns within each interlaced group of patterns preferably is progressive and unidirectional internally of the interlaced group and substantially constant both internally of the interlaced group and externally with respect to any immediately preceeding and/or immediately succeeding group of pixel patterns. To satisfy those conditions, the center-to-center lateral offset displacement, $\Delta X_0$, from the pixel centers of one pixel pattern to those of the next is selected so that:

$$\Delta X_0 = X/MN \quad (1)$$

where M=the image magnification occuring between the image bar 41 and the recording medium 13 (i.e., the output image plane).

As is known, a synchronous line printer exposes the recording medium 13 to successive pixel patterns at a predetermined rate, so the wavelength of the light beam 25 may be synchronously stepped in a sawtooth-like manner through N different wavelengths $\lambda_1, \lambda_2, \ldots \lambda_N$ at a suitable submultiple of that rate. For example, the wavelength of the light beam 25 may be stepped back and forth between two different wavelengths to interlace the odd numbered pixel patterns with the even numbered. Equation (1) confirms that the appropriate image plane lateral offset distance, $M\Delta X_0$, for that case is MX/2, which will be recognized as being a reasonable approximation of the effective image plane diameter of each pixel printed by an electrooptic image bar. Thus, it will be evident that inter-pixel intensity nulls can be essentially eliminated in electrooptic line printers by laterally interlacing two or more pixel patterns.

More generally, it can be shown that the cumulative lateral translation, $D_x$, required of the prism system 43 for N interlaced pixel patterns is given by:

$$D_x = (N-1)X/MN = (N-1)\Delta X_0 \quad (2)$$

Thus, the angular dispersion, $\delta\alpha_j$, of the prism 45 for the jth wavelength, $j=1, 2, \ldots N$, of the light beam 25 with respect to the wavelength $\lambda_1$ which experiences the least angular deviation is selected so that:

$$\delta\alpha_j = (j-1)X/LMN = (j-1)\Delta X_0/L \quad (3)$$

where L=the optical arm length from the prism 45 to the prism 46 (i.e., the effective optical arm length of the dispersion).

If thin prisms are employed (i.e., if all angles involved are less than 0.1 radian), the angular dispersion, $\delta\alpha_j$ at the prism 45 of the jth wavelength can be calculated as follows:

$$\delta\alpha_j = A(n_j - n_1) \quad (4)$$

where:
A=the apex angle of the prism 45;
$n_1$=the index of refraction of the prism 45 corresponding to the wavelength $\lambda_1$; and
$n_j$=the index of refraction of the prism 45 corresponding to the wavelength $\lambda_j$.

Therefore, to satisfy equation (3), the dispersing prism 45 is selected and optically displaced from the equalizing prism 46, so that:

$$n_j - n_1 = (j-1)\Delta X_0/AL \quad (5)$$

The apexes 47 and 48 of the prisms 45 and 46, respectively, are parallel to one another because they are preferably oppositely oriented. If they also extend parallel to the tangential plane of the printer 11, as shown in FIGS. 1 and 2, the interlaced pixel patterns will be dispersed laterally in accordance with their respective wavelengths, thereby causing them to map onto the recording medium 13 in accordance with a diamond-like mapping pattern (FIG. 7), a diagonal mapping pattern (FIG. 8), or a hexagonal mapping pattern (FIG. 9). To illustrate that point, the pixels of five successive pixel patterns have been sequentially numbered on each of these mapping patterns to indicate the time order in which they are mapped onto the recording medium 13. These mapping patterns do not differentiate among the individual pixels based upon their brightness values, but it will be understood that the brightness of any given pixel is dependent on the image being printed and is either "bright" or "dark" (or, in the case of an analog image bar, of some intermediate brightness value). To avoid any possible confusion, it is noted that the term "pixel" is being used herein to denote a spatially unique sample of an image, regardless of the brightness value that may be assigned to that sample to best represent its information content. The phrase "pixel pattern," on the other hand, is intended to indicate that each pixel has a determinable brightness value.

Figure 8:
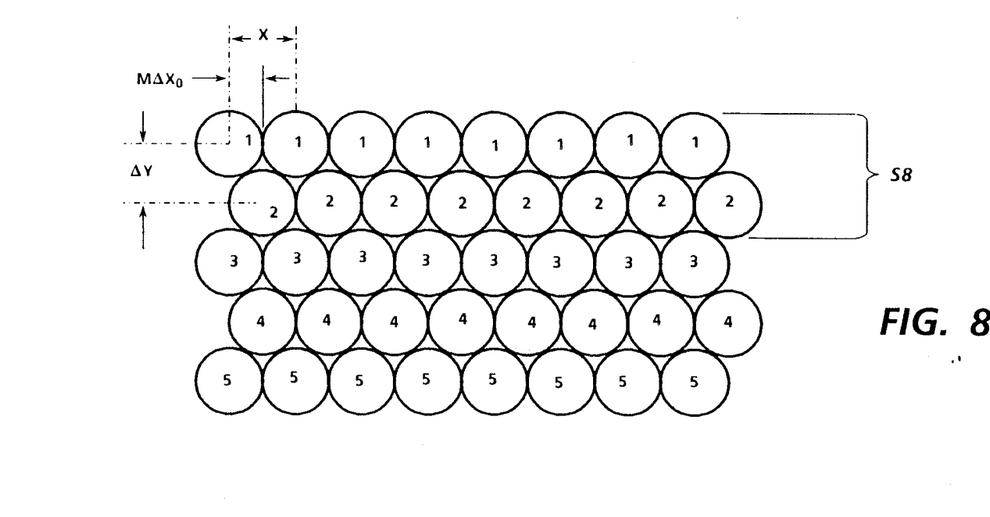
FIG. 8 illustrates a hexagonal pixel mapping pattern which also can be obtained by interlacing odd and even numbered pixel patterns without compensating for the sagittal cross-line motion of the recording medium.
Figure 9:
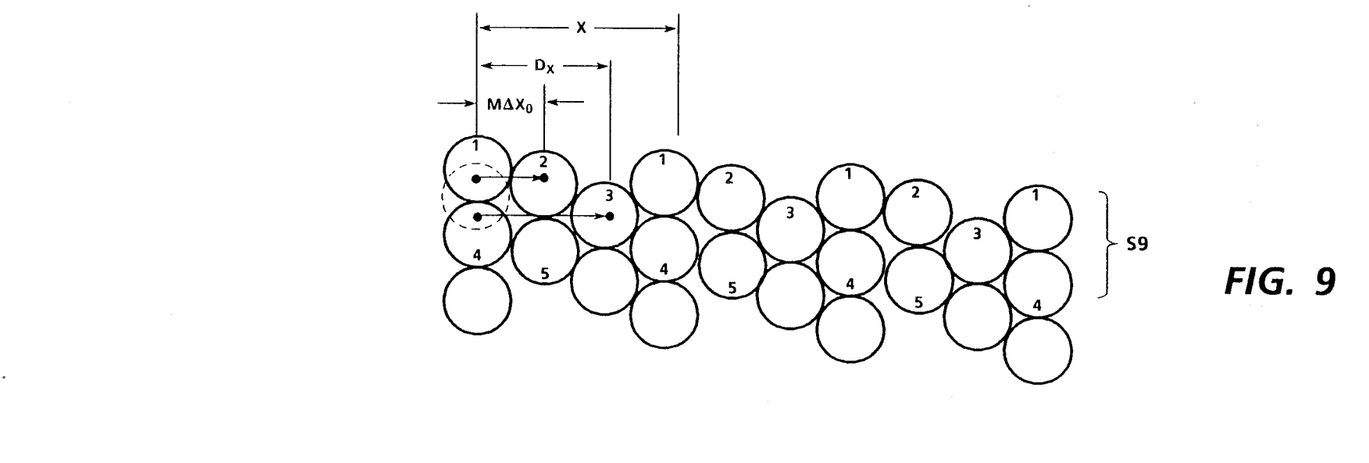
FIG. 9 illustrates a more generalized diagonal pixel mapping pattern, such as may be obtained by interlacing three or more pixel patterns without compensating for the sagittal cross-line motion of the recording medium.

The diagonal mapping pattern of FIG. 8 is of general interest because it applies to all cases where $N < 2$. Both the diamond-like mapping pattern of FIG. 7 and the hexagonal mapping pattern of FIG. 9 are limited to the case where $N=2$, but that case is of sufficient interest to warrant exploring it in some additional depth. As will be recalled, for the case of $N=2$, the wavelength of the light beam 25 is stepped back and forth between two different wavelengths, $\lambda_1$ and $\lambda_2$, so that the odd numbered pixel patterns have one of those wavelengths, say $\lambda_1$, and the even numbered pixel patterns have the other wavelength $\lambda_2$. Thus, equation (3) can be rewritten to show that appropriate angular dispersion, $\delta\alpha_2$, at the prism 45 of the wavelength $\lambda_2$ relative to the angular deviation of the wavelength $\lambda_1$ is given by:

$$\delta\alpha_2 = X/2LM \quad (6)$$

Equation (5) can also be rewritten for $N=2$ to show that:

$$n_2 - n_1 = X/2ALM = \delta n \quad (7)$$

Thus, by substituting equation (6) into equation (7) and then solving to determine the appropriate apex angle, A, for the prism 45, it will be found that:

$$A = \delta\alpha_2/\delta n = X/2\delta nL \quad (8)$$

For example, if the prisms 45 and 46 are composed of BK-7 optical glass and if the wavelengths $\lambda_1$ and $\lambda_2$ are 755 nm and 820 nm, respectively, then $n_1$ is 1.51032 and $n_2$ is 1.51170, which means that $\delta n$ is 0.00138. Now, if the desired image plane displacement, X/2, of the interlaced pixel patterns is determined to be 0.005 μm and if the prism system 43 is selected to have an effective optical arm length, L, of 50.0 μm, equation (8) indicates that each of the prisms 45 and 46 suitably has an apex angle, A, of 0.0725 radians or, in other words 4.15 degrees.

As will be appreciated, a hexagonal mapping pattern, such as shown in FIG. 9, is a specialized diamond-like mapping pattern wherein each pixel is spatially displaced equidistantly in all direction from its nearest neighboring pixels. Hexagonal mapping patterns are of interest because it has been shown that hexagonal sampling patterns require the least number of samples/unit area to unambiguously characterize a random image. See, D. P. Peterson and D. H. Middleton, "Sampling and Reconstruction of Wave-Number Limited Functions in N-Dimensional Euclidean Spaces," *Information and Control*, Vol. 5, p. 279 (1962). Thus, it is noted that such a mapping pattern is realized for $N=2$ and $M\Delta X_0 = \pm X/2$ if the cross-line displacement, $\Delta Y$, of successive pixel patterns is selected so that:

$$\Delta Y = |M\Delta X_0|\sqrt{3} \quad (9)$$

While the above-described mapping patterns may be suitable for some applications of the present invention, there are other mapping patterns which can be accomodated. For example, a rectangular mapping pattern usually is employed for electronic printing. Accordingly, in keeping with one of the more detailed aspects of this invention, provision can be made for partially or completely compensating for the cross-line motion of the recording medium 13 that occurs while it is being exposed to each set of N laterally interlaced pixel patterns lines. The pixel centers of the corresponding pixel patterns (e.g., the first) of any two successive sets of interlaced pixel patterns are displaced from one another due to the cross-line motion of the recording medium 13 by a distance, Y, which is given by:

$$Y = Nv/r \quad (10)$$

where:
  v = the velocity at which the recording medium 13 is advancing in the cross-line direction relative to the image bar 41; and
  r = the rate at which the pixel patterns are being generated.

Moreover, the incremental cross-line offset distance, $\Delta Y$, between any two successive pixel patterns is given by:

$$\Delta Y = Y/N = v/r \quad (11)$$

which means that the maximum cross-line dispersion, $D_y$, that the prism system 43 must provide to fully compensate for the cross-line motion of the recording medium 13 is:

$$D_y = (N-1)\Delta Y/M = (N-1)v/Mr \quad (12)$$

Figure 10:
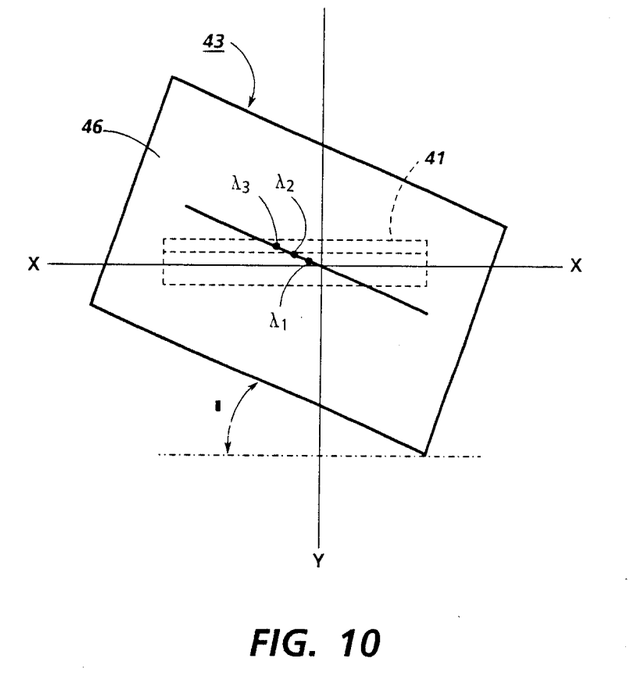
FIG. 10 is an image plane view of the prism system shown in FIGS. 5 and 6 to illustrate how it may be tilted to compensate for the cross-line motion of the recording medium.

Accordingly, it will be understood that a generally rectangular mapping pattern is provided if the prism system 43 is tilted, as shown in FIG. 10, with respect to the tangential plane of the printer 11 so that light beam 25 is dispersed both laterally and sagittally in accordance with its respective wavelengths. The sagittal dispersion required may be vectorally summed with the above-described lateral dispersion to determine the angle at which the apexes of the prisms 45 and 46 should extend relative to the tangential plane of the printer 11. From equation (12) it will be evident that for complete sagittal compensation the sagittal dispersion, $\delta\beta_j$, required at the prism 45 for the jth wavelength of the light beam 25 relative to the wavelength $\lambda_1$ which experiences the least angular deviation is given to a first approximation for small angles by:

$$\delta\beta_j \approx (j-1)v/LMr = (j-1)\Delta Y/LM \quad (13)$$

Thus, the appropriate total dispersion, $\gamma$, for the prism system is $$\delta\gamma = (\delta\alpha_j^2 + \delta\beta_j^2)^{\frac{1}{2}} \quad (14)$$

The pixel densities $d_x$ and $d_y$ along the x and y-axes, respectively, of a rectangular mapping pattern are given by:

$$d_x = N/X = 1/M\Delta X_0 \quad (15)$$

and $$d_y = 1/Y = 1/N\Delta Y \quad (16)$$

By definition, a square mapping pattern requires that:

$$d_y/d_x = M\Delta X_0/N\Delta Y = 1 \quad (17)$$

Thus, from equations (1), (11) and (15)–(17) it will be evident that if a square mapping pattern having N interlaced pixel patterns per line is desired, the rate, r, at which the pixel patterns are generated should be selected so that:

$$r = N^2 v/X \quad (18)$$

Now, referring FIG. 10 and to equation (17) to determine the tilt angle, $\theta$, of the prism 43 that will result in a square mapping pattern, it will be apparent that such a mapping pattern requires that:

$$\theta = \tan^{-1}(\Delta Y/M\Delta X_0) = \tan^{-1}(1/N) \quad (19)$$

Asynchronous printers and the like may experience significant variations in the velocity, v, at which the recording medium 13 is being advanced, but it will be recognized that the rate, r, at which the pixel patterns are generated may be controlled (by means not shown)

if need be to more or less continuously compensate for any such variations.

Applying equations (18) and (19) to determine, for example, the rate, r, at which the pixel patterns should be generated and angle, $\theta$, at which the prism system 43 should be tilted to obtain a square mapping pattern of alternately interlaced, odd and even numbered pixel patterns, it will be seen that the appropriate selections for that specific case are:

$$r = 4v/X \quad (20)$$

and $$\theta = \tan^{-1}(\tfrac{1}{2}) \approx 26.56° \quad (21)$$

If desired, there may only be partial compensation for the cross-line motion of the recording medium 13. As a general rule, however, the additional cost and complexity of compensating for such motion is difficult to justify if substantially complete compensation is not provided, unless some special recording lattice or pattern is desired. There are, of course, alternative applications for certain of the concepts of the present invention. For example, the sagittal compensation for the cross-line motion of the recording medium 13 might be employed independently to cause overwriting of N successive pixel patterns in registered relationship, such as for writing N colors on a polychromatic recording medium 13 or for recording a 2N level gray scale image by registering N successive pixel patterns of progressively increasing or decreasing gray scale value. However, the lateral dispersion is significant when the goal is to provide increased spatial addressing capacity for a discrete image bar because the addressing capacity or resolution of such an image bar is N times its nominal pixel pitch, X, if successive pixel patterns are laterally displaced from one another as described hereinabove. As will be understood, the cross-line motion of the recording medium 13 is a relative motion with respect to the image bar 41 which may be introduced in a number of different ways, including by means of a cross-line optical deflection mechanism (not shown).

CONCLUSION

In view of the foregoing, it will now be understood that the present invention provides a passive optical method and means for increasing the spatial addressing capacity of variable wavelength discrete image bars. This increased spatial addressing capacity may be used, for example, to increase the resolution of line printers having such image bars, thereby enhancing the quality of the images that are produced. As will be appreciated, the increased spatial addressing capacity that is provided for discrete image bars in accordance with this invention not only reduces their image distorting spatial quantization errors, but also reduces or eliminates unwanted inter-pixel intensity nulls. Furthermore, it will be understood that the are alternative applications for certain aspects of this invention, including the ability to overwrite successive pixel patterns in registered relationship for color or gray scale recording in printers or displays.

What is claimed is:

1. The combination comprising
   a variable wavelength discrete optical image bar for sequentially generating successive, mutually independent pixel patterns at different wavelengths, each of said pixel patterns containing a plurality of pixels, and
   an optical system for superimposing said pixel patterns on an output image plane so that the pixels of each of said pixel patterns are spatially distributed generally uniformly on said image plane on respective laterally displaced centers;
   said optical system including optical means for dispersing said pixel patterns laterally with respect to said image plane in accordance with their respective wavelengths,
   said optical means having an optical arm length selected to laterally offset the centers of the pixels of said dispersed pixel patterns by a distance which is less than the lateral displacement of the centers of adjacent pixels of any one of said pixel patterns,
   whereby said pixel patterns are laterally interlaced in accordance with their respective wavelengths while being mapped onto said image plane, thereby providing an increased spatial addressing capacity for said image bar.

2. The combination of claim 1 wherein
   different wavelength pixel patterns are laterally offset from one another on said image plane by a substantially constant lateral offset distance.

3. The combination of claim 2 wherein
   a recording medium advances across said image plane in an orthogonal cross-line direction with respect to said image bar while each successive set of N pixel patterns are being generated, where $N \geq 2$,
   said optical means is a prism system which is tilted at a predetermined acute angle with respect to said cross-line direction to disperse said pixel patterns both laterally and in said cross-line direction with respect to said recording medium, and
   the wavelengths of the pixel patterns of each of said sets are progressively varied to cause the cross-line dispersion provided by said prism system to at least partially compensate for the cross-line advance of said recording medium.

4. The combination of claim 3 wherein
   said cross-line dispersion substantially completely compensates for the cross-line advance of said recording medium which occurs while each of said sets of pixel patterns are being generated,
   each of said sets of pixel patterns is generally aligned laterally on said recording medium.

5. The combination of claim 1 wherein
   said optical system is telecentric, and
   said optical means is a prism system composed of a pair of substantially identical, oppositely oriented prisms which are optically aligned with one another at opposite ends of said optical arm.

6. The combination of claim 5 wherein
   said image bar includes an electrooptic spatial light modulator for generating said pixel patterns,
   said optical system includes a telecentric Schlieren imaging system for imaging said pixel patterns onto said image plane, and
   said prism system is optically aligned between said modulator and said imaging system.

7. The combination of claim 1 wherein
   the wavelengths of said successive pixel patterns are cyclically varied through N different wavelengths, where N is $\geq 2$
   whereby each successive set of N pixel patterns are laterally interlaced with one another on said image plane in accordance with a repetitive interlacing pattern.

8. The combination of claim 7 wherein said N different wavelengths are selected to be wavelengths which said optical means incrementally varies the dispersion of by a substantially constant amount, whereby the centers of adjacent pixel patterns within each of said sets are laterally offset from one another by a substantially constant offset distance.

9. The combination of claim 8 wherein said image bar comprises a spatial light modulator, and a recording medium advances across said image plane in an orthogonal cross-line direction relative to said modulator while said pixel patterns are being mapped thereon.

10. The combination of claim 9 wherein said pixel patterns are cyclically varied between two different wavelengths so that odd numbered pixel patterns are laterally interlaced with even numbered pixel patterns on said recording medium, said wavelengths are selected to cause the centers of the odd and even numbered pixel patterns to be laterally offset from each other on the recording medium by a distance which is approximately equal to one half the lateral displacement distance between the pixels of any one of said pixel patterns, and said recording medium advances relative to said modulator at a rate which causes successive pixel patterns to be displaced from one another in said cross-line direction on said recording medium by a distance that is approximately equal to said offset distance times $\sqrt{3}$, whereby said odd and even numbered pixel patterns are mapped onto said recording medium substantially in accordance with a hexagonal mapping pattern.

11. The combination of claim 9 wherein said optical means is a prism system which is tilted at a predetermined acute angle with respect to said cross-line direction to disperse said pixel patterns both laterally and in said cross-line direction with respect to said recording medium, and the wavelengths of said pixel patterns are cyclically varied through said N different wavelengths in a predetermined order so that the cross-line dispersion of said prism system at least partially compensates for the cross-line advance of said recording medium that occurs while each set of N pixel patterns is being generated.

12. The combination of claim 10 wherein the cross-line dispersion provided by said prism substantially completely compensates on a pixel pattern-by-pixel pattern basis for the cross-line advance of said recording medium that occurs while each set of pixel patterns is being generated, whereby said pixel patterns are mapped onto said recording medium in accordance with a substantially rectangular mapping pattern.

13. The combination of claim 12 wherein said recording medium is an photosensitive medium which is sequentially exposed to said pixel patterns to form an image.

14. The combination of claim 12 wherein the cross-line advance of said recording medium for each cycle of said pixel pattern wavelength is substantially equal to said lateral offset distance, whereby said pixel patterns are mapped onto said recording medium in accordance with a substantially square mapping pattern.

15. The combination comprising a variable wavelength discrete optical image bar for sequentially generating successive, mutually independent pixel patterns at N different wavelengths, where $N \geq 2$ and each of said pixel patterns contains a plurality of pixels, and an optical system for superimposing said pixel patterns on an output image plane so that the pixels of each of said pixel patterns are spatially distributed generally uniformly on said image plane on respective laterally displaced centers while said image plane is advancing in an orthogonal cross-line direction with respect to said image bar;

said optical system including optical means for dispersing said pixel patterns in said cross-line direction with respect to said image plane in accordance with their respective wavelengths to substantially completely compensate on a pixel pattern-by-pixel pattern basis for the cross-line advance of said image plane.

16. The combination of claim 15 wherein the wavelength for said successive pixel patterns is cyclically stepped in a predetermined order through said N different wavelengths, whereby the cross-line dispersion of said wavelengths substantially compensates for the cross-line advance of said recording medium which occurs while each successive set of N pixel patterns is being generated.

17. The combination of claim 16 wherein said optical system is telecentric, and said optical means is a prism system composed of a pair of substantially identical, oppositely oriented prisms located at opposite ends of an optical arm of predetermined length.

18. The combination of claim 17 wherein said image bar is an electrooptic spatial light modulator, said optical system includes a telecentric Schlieren imaging system for imaging said modulator onto said image plane, and said prism system is optically interposed between said modulator and said imaging system.

* * * * *